(12) United States Patent
Desai et al.

(10) Patent No.: US 7,421,551 B2
(45) Date of Patent: Sep. 2, 2008

(54) FAST VERIFICATION OF COMPUTER BACKUP DATA

(75) Inventors: Asit A. Desai, San Ramon, CA (US); Antony E. Boggis, Kentfield, CA (US)

(73) Assignee: EMC Corporation, Hopkinton, MA (US)

( * ) Notice: Subject to any disclaimer, the term of this patent is extended or adjusted under 35 U.S.C. 154(b) by 160 days.

(21) Appl. No.: 11/347,759

(22) Filed: Feb. 3, 2006

(65) Prior Publication Data

US 2007/0186066 A1 Aug. 9, 2007

(51) Int. Cl.
*G06F 12/16* (2006.01)
*G06F 13/00* (2006.01)

(52) U.S. Cl. ................ 711/162; 711/100; 711/154; 711/161

(58) Field of Classification Search ............ 711/162, 711/161, 100, 154
See application file for complete search history.

(56) References Cited

U.S. PATENT DOCUMENTS

2005/0283662 A1* 12/2005 Li et al. ................ 714/13
2006/0242489 A1* 10/2006 Brockway et al. ........... 714/718

* cited by examiner

*Primary Examiner*—Tuan V. Thai
(74) *Attorney, Agent, or Firm*—Barry N. Young (57) ABSTRACT

A backup method for a computer system that affords fast verification of source data written to backup media includes reading a portion of the source data from a source storage volume and generating a hash of the source data. The source data is written to the backup media as backup data, and the hash generated from the source data is written to the backup media and associated with the backup data corresponding to the source data from which the hash was generated. Verification of the backup data can be subsequently performed by reading the backup data from the backup media, generating a hash from the backup data read, and comparing that hash with the hash originally stored on the backup media. This enables the backup data to be verified as corresponding to the original source data without the necessity of rereading the source data from the source volume, and enables faster, more accurate off line verification subsequent to the backup process.

17 Claims, 5 Drawing Sheets

FAST VERIFICATION OF COMPUTER BACKUP DATA

CROSS REFERENCE TO RELATED APPLICATIONS

This application is related to commonly-owned co-pending application filed concurrently herewith and entitled "Improved Verification of Computer Backup Data" Ser. No. 11/346,898.

BACKGROUND OF THE INVENTION

This invention relates generally to methods and systems for backing up computer data in computer systems, and more particularly to methods and systems for verifying the accuracy and integrity of backup data.

Computer systems store data that is unique and often critical, and, if lost, the data would frequently be expensive, difficult or impossible to replace. The data is normally stored on hard disks or other storage technology which is subject to the possibility of failure. Additionally, data may also be lost by theft, fire or other disaster, and frequently the data loss is permanent. Accordingly, backup methods and systems have been developed to maintain controlled redundancy of data to enable data to be recovered in the event of a disaster to avoid or minimize the loss of the data.

Backup systems copy source data from a computer source volume to backup media so that if the original source data is lost, it may be restored from the backup copy. Since data in a computer system is continuously being created or modified, it is important that the backup process be performed frequently to ensure that the backup copy of the data is reasonably current. While backup may occur continuously during the operation of a computer, this is usually not preferred since backup can either slow down or prevent normal computer systems operations. Accordingly, most backup is batch-oriented and performed at a predetermined time during a backup window, such as at night when the computer systems are not being used for normal processing operations. This is particularly the case for systems which backup data in computer networks of large enterprises that have many different computers and many different source storage volumes to backup.

Depending upon the volume of original source data to be backed up and the type of backup technology employed, backup may be a time-consuming and burdensome process. If the amount of source data stored on a source volume, such as a hard disk, that is being backed up spans multiple backup media, i.e., exceeds the capacity of a single media such as a tape or optical disk, for example, and a single backup device is being employed for backup, the backup process must be interrupted while new media is mounted on the backup drive. This also frequently requires recopying a portion of the previously copied data to the new backup media, particularly if the first backup media ran out in the middle of a data file being copied. The individual pieces of backup media, such as tapes, CD/DVD discs, disks, or cartridges are referred to as members of a backup set, and the backup set may back up one or more source volumes.

For enterprises having a network comprising many different computers and source volumes, the backup window may afford insufficient time for copying source data that needs to be backed up to backup media. Depending upon the backup media, the volume of source data, and the network speed, a considerable amount of time may be required simply to copy the source data. Moreover, in addition to copying source data to the backup media, it is desirable to verify that the source data is copied correctly so that an accurate backup set is maintained. Thus, backup processes normally include a verification process to insure that source data is copied correctly to the backup media.

Verification as presently done on known systems involves comparing the backup data in the backup set with the original source data, and is usually done right after the source data is copied to the backup media. If the backup set spans multiple media, in order to perform verification it is necessary to remount all members of the backup media to which data has been written in order to perform verification. Thus, if a source volume of original data being backed up spans two media members, not only must the backup process be interrupted in order to mount the second media when the first becomes full to complete copying the source data, during verification the process must again be interrupted by remounting the first backup member to verify the portion of the source data written on it, and then mounting the second backup media to verify the source data written on the second media. Even if the data does not span multiple media, when backing up multiple sources to a sequential access medium, such as tape, conventional backup requires backup, rewind, verification, rewind and verification. This is time consuming and causes wear and tear of the medium. Such time and overhead burdens of the backup and verification processes may prevent backup from being completed during the backup window. Accordingly, the system administrator may be able to perform only a partial backup during the backup window, backing up only some of the source volumes which need to be backed up, and may be required to schedule backup of other source volumes for different times or days. Otherwise, the administrator may be required to forego the verification process, which is undesirable, or extend the backup window into the period of normal operations, running the risk of disrupting normal operations or trying to backup files as they are being changed, which is also undesirable.

Moreover, even if the system administrator is able to postpone verification until after the backup window, this is not a practical or effective solution. It would still be necessary to compare the original source data with the backup data copied to the backup media for verification, which requires access to the source volume and possible disruption of normal operations. Also, if the original source data was changed between the time it was copied to the backup media and the time when verification is performed, the files would "miscompare", indicating invalid backup data, and the verification would fail even if the original data was copied correctly to the backup media.

Verification is also desirable during other data transfer operations. For example, it is desirable to verify the integrity of data read from the backup media and copied to another media, as for archiving or making a duplicate copy of the backup data. These operations also require access to the original source data, and involve the same difficulties as those encountered during verification of backup.

It is desirable to provide backup methods and systems which avoid the foregoing and other problems of known backup approaches by affording backup processes that have faster, more flexible, and more complete verification, that do not unduly burden the normal operations of the source computer systems being backed up, and that ensure greater accuracy and integrity of the backup data. It is to these ends that the present invention is directed.

DESCRIPTION OF PREFERRED EMBODIMENTS

The present invention is particularly well adapted to backing up multiple computers in a computer system network, and will be described in that context. As will be appreciated, however, this is illustrative of only one utility of the invention, and the invention has broader applicability to data storage, handling and transfer operations more generally.

Figure 1:
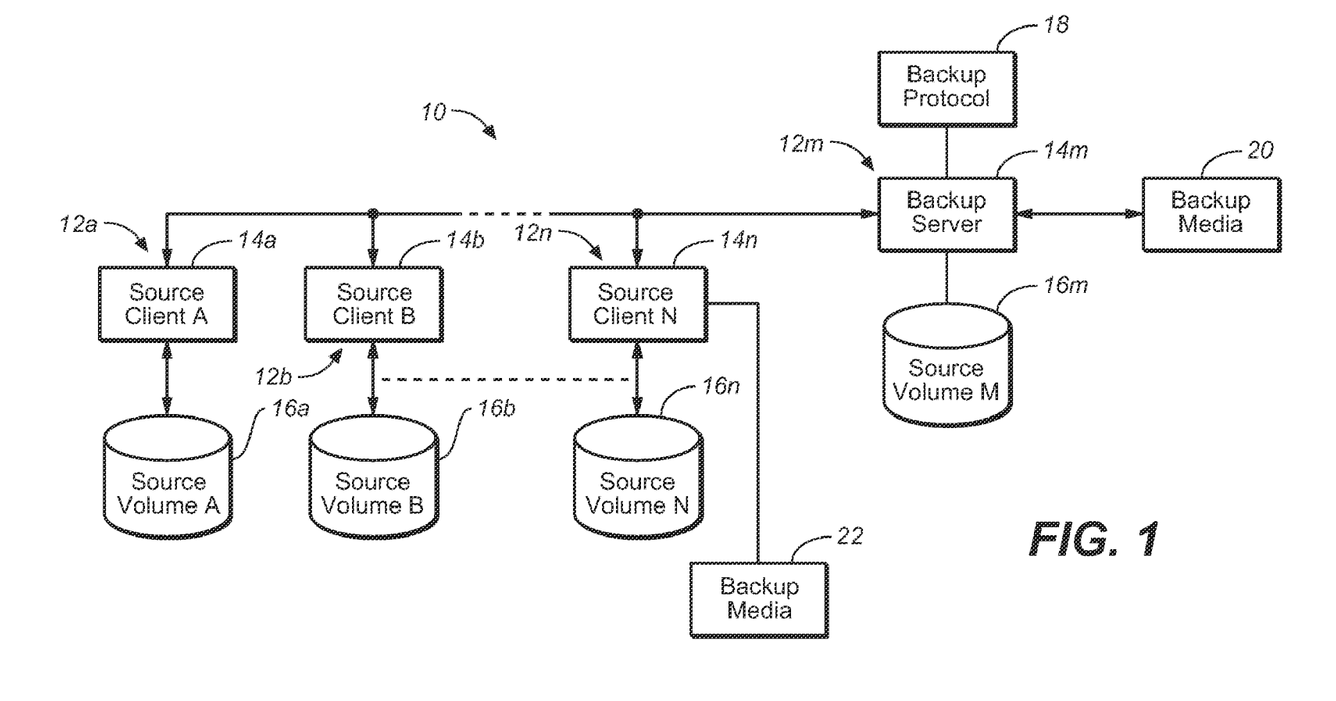
FIG. 1 is a block diagram of a computer system of the type with which the invention may be employed.

FIG. 1 is a block diagram of a computer system network 10 of the type with which the invention may be employed. As shown, the network may comprise a plurality of computer systems 12a, 12b, . . . 12m connected together in a network. Computer systems 12a-12n may each comprise a source client computer 14a-14n and one or more source data storage volumes 16a-16n, which may be hard disks, for example. The source clients may be either the same type of computer or different computers. They may be, for instance, desktop computers, mobile computers such as laptops, or server computers. Although only one source volume is shown in FIG. 1 connected to a client, it will be appreciated that a client may have multiple source volumes, and that a source client computer may in fact be a storage server that manages a group of interconnected storage volumes. Computer system 12m is a backup computer system, referred to in this description as a backup server. It may simply comprise another computer on the network that is similar to the source client computers. The backup server 14m may execute a backup software program (protocol) comprising machine executable instructions stored on a computer readable media 18 that control the server to perform a backup method in accordance with the invention. Source client computers 14a-14n may also execute client software application programs as part of the backup process. These client software application programs may be included on computer readable media 18, and installed on each source client computer by the backup server.

As will be described, the backup method copies source data from the source volumes 16a-16m to one or more backup media 20, 22. The backup media may comprise tape, hard disks or CD/DVD discs, for example. As shown, the backup server 12m may also have a source data volume, 16m, and the backup media may be distributed, comprising backup media 20 connected to the backup server and other backup media connected to one or more client computers, such as backup media 22 shown connected to client computer 14n.

Backup server 14m and source client computers 14a-14n perform backup operations in accordance with the backup protocol on media 18. The backup protocol may comprise not only the backup software programs which control the server and clients to copy source data from the source volumes to the backup media and perform verification of the backup data, but may also comprise backup scripts which prescribe different types of backup operations and different times at which the backup operations are performed. For example, in the case of a network with a large number of source clients and a large number of source volumes to be backed up, the backup protocol may direct the backup server to perform a normal backup operation daily as, for example, during the night, to copy only source data which has changed since the last backup. Then, over weekends or holidays when normal computer operations are not being conducted, the backup server may perform a full backup and copy all source files to the backup media.

As will be appreciated, the invention is also applicable to a computer system comprising a single computer and a single source volume, such as backup server 14m and source volume 16m or source client 14n and source volume 16n, where the computer runs the backup protocol and backs up its own source volume to the backup media. Moreover, computer system network 10 of FIG. 1 may be a local area network (LAN) or a subnet of a wide area network (WAN) comprising a plurality of local area networks or subnets, each having its own backup server and executing its own backup protocol. Furthermore, as will be appreciated, backup server 12m may backup source data from other networks that are connected to network 10.

Figure 2:
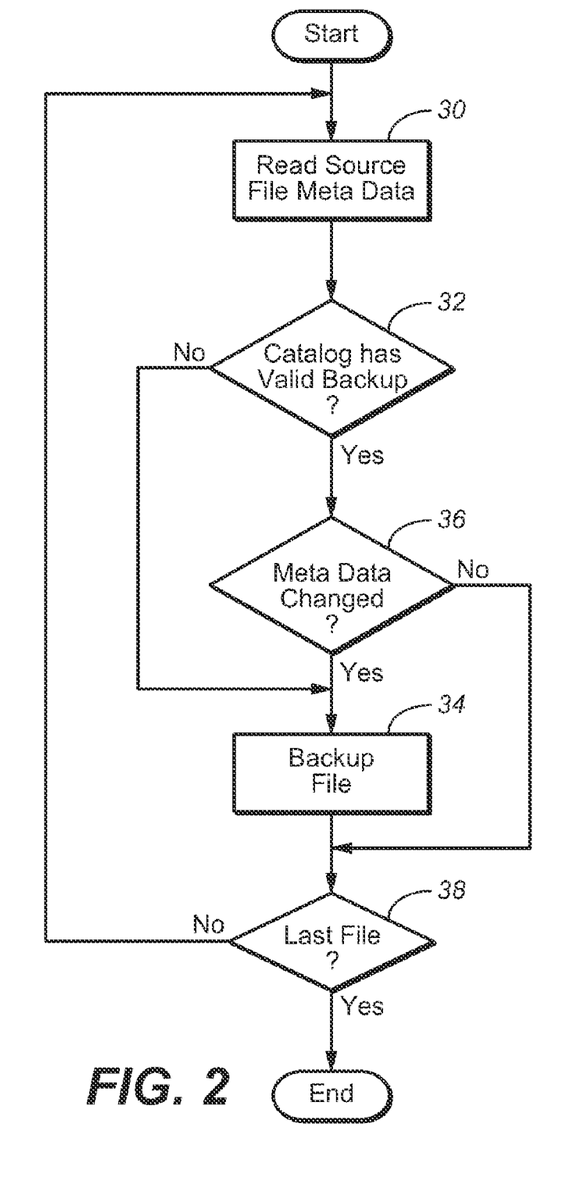
FIG. 2 is a flowchart illustrating an overview of a preferred embodiment of a backup process.

FIG. 2 gives an overview of a preferred embodiment of a backup process which may be embodied in the backup protocol on media 18 and performed on the backup server and the source clients. The process illustrated in FIG. 2 backs up source data files that are either newly created or that have changed or been modified since they were last backed up. The process begins at 30 by reading the metadata of a source data file from a source storage volume. Next, at 32, the process determines whether there is a valid backup of the source file. It may do this by looking to a catalog which may be stored in the backup server for metadata corresponding to the source file. As will be described, the catalog provides an index of the files that are stored on the backup server and certain information about the files, such as when the backup file was written to the backup media. By comparing the metadata of the source file read at step 30 with the catalog, the process determines whether there is a valid backup of the source file, i.e., a backup that did not previously miscompare, as will be explained shortly. If a valid backup of the file does not exist, the file is backed up at 34. If a valid backup does exist, at step 36 a determination is made as to whether the metadata of the source file has changed. If the metadata has changed, this indicates that the file has changed since its last update, and the process proceeds to step 34 where the file is backed up to the backup media. At step 38, the backup process looks to determine whether the file was the last file of the source volume. If it was the last file, the process ends. If the file was not the last file, the process returns to step 30 where the next file on the source volume is read and the process is repeated. The backup process continues until all files of a source volume have been inspected and backed up if necessary. The process may then be repeated, according to predetermined scripts, for each subsequent source volume of each source client until all files of all source volumes have been inspected and backed up.

The catalog to which the backup process looks to determine whether there is a valid backup of a file may comprise a data structure which stores "bookkeeping" information about files. An example of a catalog and the type of information it may contain about source data that may be employed is described in commonly owned U.S. Pat. No. 5,150,473, the disclosure of which is incorporated by reference herein. Data files stored on source volumes are stored in directories in hierarchical tree structures. The catalog data provides information on the tree structure of each source data file. This information may be written onto the backup media with a copied file to indicate the location of the file on the source volumes and to permit easy identification of files. This information is preferably written onto the source media as a header along with the backup file, as will be described shortly in connection with FIG. 4.

Figure 3:
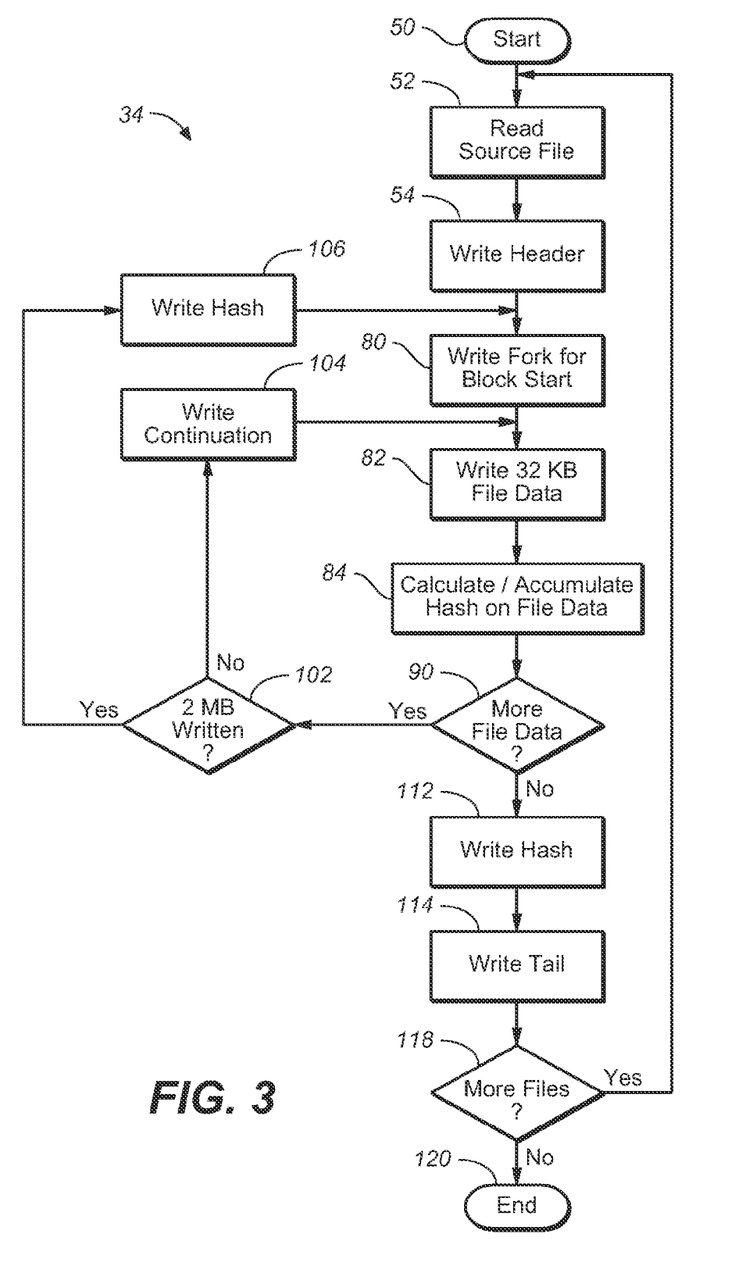
FIG. 3 is a flowchart illustrating in more detail the backup process of FIG. 2.
Figure 4:
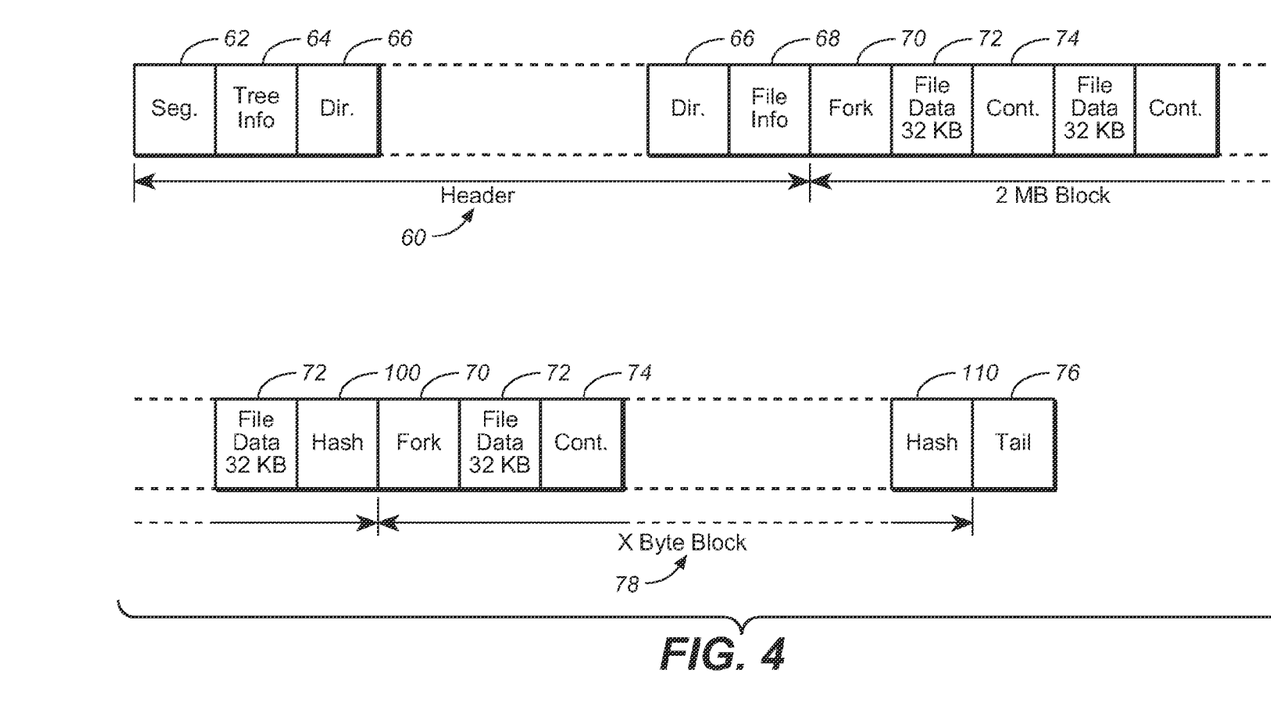
FIG. 4 is a diagrammatic view of a preferred backup data format used in the backup process.

FIG. 3 illustrates in more detail a preferred embodiment of the file backup step 34 of FIG. 3 for copying a source file from the source volume to the backup media. FIG. 4 illustrates a preferred backup data format on the backup media. Referring to FIG. 3, the process for backing up the file starts at step 50. At step 52, a source file is read from the source volume, and at step 54 a header 60 (see FIG. 4) is written to the backup media. As indicated in FIG. 4, the header preferably contains a number of separate records that provide different information about the file, as described in the previously referenced U.S. Pat. No. 5,150,473. As shown, the header records may include a segment record 62 which provides information about the backup segment upon which the data is written, a tree information record 64 which provides tree information about the volume and file system, and a plurality of directory records 66 which provide information on the hierarchical tree structure in which the file is located on the source volume. Next, a file information record 68 may be written that provides metadata information about the source file which is being written.

As indicated in FIG. 4, files are preferably written in blocks having a predetermined block length. A preferred length is a block containing a predetermined number of bytes corresponding to, e.g., 2 MB (megabytes) or less, as indicated in FIG. 4, although blocks of any other convenient length may be employed. Depending upon the size of the source file, a plurality of 2 MB blocks containing the backup data will be concatenated on the backup media until the complete file has been copied. The beginning of each 2 MB block may be indicated by a fork record 70 which is used to separate the 2 MB blocks. As indicated in FIG. 4, each 2 MB block will contain a plurality of concatenated records. File data is written preferably in a plurality of sub-blocks (or records) 72 of a predetermined size. Preferably file records 72 have a length of 32 KB, which is a convenient size but other sizes may also be employed as desired. File records 72 are preferably separated by a continuation record 74 to delineate file records. A tail record 76 may be written onto the backup media at the end of the backup data file corresponding to the end of the source data file. Moreover, as indicated in FIG. 4, where the last block of source data requires a block that is less than 2 MB in length, the last backup data block 78 corresponding to that source data block that is written to the backup media will be less than 2 MB.

Returning to FIG. 3, after the header 60 is written at step 54 of the backup process onto the backup media, the backup process then writes a fork record (70) at step 80 to indicate the beginning of the first 2 MB block of backup data. The process may then write the first 32 KB file data record at 82. Next, at step 84, the process generates a hash of the 32 KB block of file data just written, and accumulates the hash with hashes generated from preceding 32 KB file data records (if any) in the 2 MB block. The hash, which may be a conventional MD-5 hash, as will be described in more detail shortly, is used to create a unique identifier for the 32 KB record of source file data. The hash may be generated in the backup server, for example, and may be stored temporarily within the backup server and accumulated with the MD-5 hashes generated from other 32 KB source data records until the end of the 2 MB block of data is reached and the accumulated hash is written to the backup media.

At step 90, the process determines whether there is more source file data. If so, the process branches to step 102 where a determination is made as to whether the size of the block which has been written to the backup media has reached the predetermined block size of 2 MB. If the size of the block of backup data is less than 2 MB, at step 104 a continuation record 74 may be written to the backup media, and the process returns to step 82 where the next 32 KB record of source file data is written as backup data. The process then generates the hash for the next record, and accumulates it with other hashes at 84.

If, at step 102, the size of the block of backup data on the backup media has reached 2 MB, the backup process proceeds to step 106 which writes the accumulated hash value as a hash record 100 on the backup media and associates the hash with the 2 MB block. Preferably, this is done by writing the hash following the last 32 KB source file data record, as indicated in FIG. 4, where the hash record 100 is written at the end of the 2 MB block of data. The backup process may then return to step 80 where a fork record 70 is written for the beginning of the next block of data, and the process repeats steps 82, 84 and 90.

At step 90 of the backup process in FIG. 3, if it is determined that there is no additional file data to be written, the backup process proceeds to write and associate a final hash record 110 (see FIG. 4) at step 112 with the last block 78. Next, the process may write a tail record 76 at step 114 to indicate the end of the source data file. At step 118, the process determines whether there are any additional source files to be backed up. If there are additional source files, the backup process returns to step 52 and is repeated for the additional files. If there are no additional backup files, the process ends at step 120.

The hash records 100, 110 written at steps 106 and 112, respectively, for each 2 MB block of data may be generated using any of a number of different well-known hash algorithms. The purpose of the hash, as indicated above, is to afford a unique identifier of the source data files contained within each 2 MB block, and to readily indicate any difference between the original source data and the backup data on the backup media. As described above, a preferred hash algorithm is the well-known MD-5 hash algorithm. This hash produces a constant length 128 bit (16 byte) hash. The MD-5 hash algorithm is very efficient and can be easily and quickly calculated without imposing undue processing burden on the computer that would slow down the backup process. Moreover, the MD-5 hash results in low collision between two data sets of 2 MB length, i.e., low probability of the same hash value being produced for two data sets.

The overhead for storing MD-5 hashes on the backup media is also small. For large blocks of data of 2 MB, the overhead of 128 bytes per file works out to be only about 13 MB overhead per 200 GB of data. If there are many small files, for example around 2 KB, the overhead is about 13 GB. However for average file sizes, the overhead will typically be of the order of 1%, but in worse case may be as much as 5%. Other hashes which may be employed, but are less preferable, include the SA-1 hash and the CRC-32 hash. The SA-1 hash is more computer intensive to generate than the MD-5 hash, and can slow down the backup process. The CRC-32 hash is easy to generate, but is less secure and is less capable of detecting small variations between two data sets.

After the source data has been written to the backup media, it is desirable to verify the accuracy and integrity of the source data files that were copied as backup files to the backup media. Before the invention, verification has required rereading the original source data from the source volume, and comparing it with the backup data on the backup media. As explained above, such verification processes are time consuming and inconvenient because they require access to the original source data on the source volume.

Figure 5:
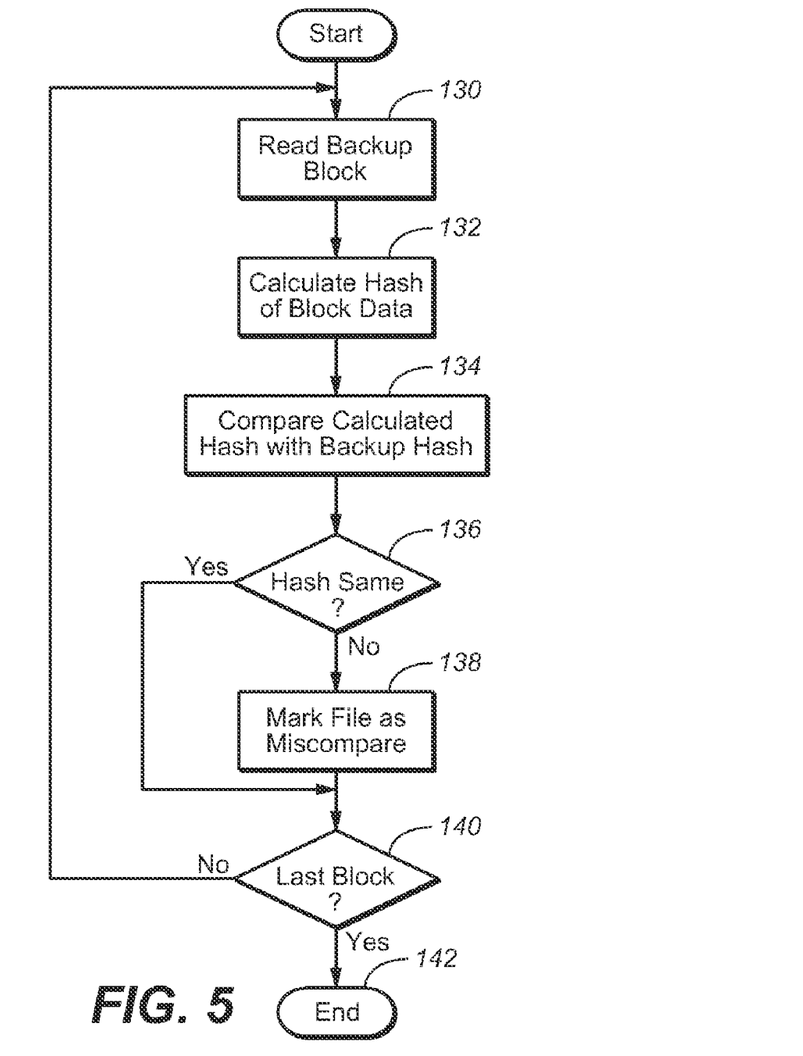
FIG. 5 is a flowchart illustrating a preferred embodiment of a verification process.

The invention avoids these difficulties by providing a verification process that obviates the need to access the original source data for verification. The invention enables verification to be performed completely and reliably at any time subsequent to the source data being backed up. This is accomplished, as will be described, by using the hashes which are written on the backup media during the backup of source data. FIG. 5 is a flowchart of the verification process in accordance with the invention.

As shown in FIG. 5, verification begins at step 130 where a block (e.g., 2 MB) of backup data is read from the backup media. As the backup data is read, a hash is generated at step 132 for each 32 KB record of backup data using the same algorithm which produced the original hash, i.e., the MD-5 algorithm, and the hashes are accumulated for the records until the end of the 2 MB block of data is reached. This process may be similar to the process by which the hashes were generated and accumulated during the backup process illustrated in FIG. 3. The accumulated hash is then compared at step 134 (FIG. 5) of the verification process with the hash that was generated from the original source data, and written to the backup media and associated with the corresponding backup file on the backup media during the backup process. At step 136, a determination is made as to whether the two hashes are the same. If the hash generated from the backup data matches the hash generated from the original source data and written to the backup media, this indicates that the backup data is accurate and the process proceeds to step 140. If the hashes do not compare, the backup file is marked at step 138 as a "miscompare", and the original source data file will be recopied to the backup media during a subsequent backup process. At step 140, the verification process determines whether there are any additional blocks to be verified. If so, the process returns to step 130 and the verification process is repeated for the additional blocks until the end of the file is reached. If there are no more blocks, the process ends at step 142.

As will be apparent from the foregoing, since the hash written on the backup media is generated from the original source data at the time the original source data is copied to the backup file, the hash accurately reflects the original source data at the time it was copied. Accordingly, verification can be performed at any time after the original data was copied to the backup file without the necessity of accessing the original source data. This enables verification to be performed offline, and even when the original source data is not available. More importantly, back up of source data need not be interrupted for verification to be performed during the backup window. Therefore, the backup window may be devoted entirely to backing up source data, and verification may be postponed until a more convenient time. Moreover, the process enables faster verification when the backup data spans multiple media. Since verification is performed on blocks rather than on entire files, verification can be completed for data blocks on a first media without the necessity of interrupting verification to mount a second media on the back up drive to complete verification, as would be the case for larger files.

The process additionally advantageously allows a system administrator to create verification scripts that specify particular backup sets for verification and establish a flexible schedule. This enables verification without concern about a backup window, or otherwise disrupting normal processing or interfering with normal computer system operations. In addition, because verification is no longer dependent upon the availability of original source data or the need to access the original source volume, an administrator has the option of beginning verification of a backup set beginning from sessions added since the last verification process, or optionally starting the verification process from the beginning of the backup set.

The process also advantageously allows verification of data transfer operations for other than just backup. For example, data transferred from backup media for a restore process, or to copy the backup data to another archive media, or to make another copy of the backup set may be performed and verified to ensure the integrity and accuracy of the data transfer. In this way, the administrator can be assured that all copies of the backup data are accurate and correspond to the original source data without the necessity of performing a conventional backup and verification process. This may be accomplished by using the backup data on the backup media as analogous to source data on a source volume, generating a hash from the backup data transferred to the copy, and comparing this generated hash to the hash that was produced from the original source data and written on the backup media.

While the foregoing description of the invention has been with reference to a preferred embodiment, it will be appreciated by those skilled in the art that changes in this embodiment may be made without departing from the principles and spirit of the invention, the scope of which is defined by the appended claims.

The invention claimed is:

1. A method of backing up source data from a source storage volume of a computer system to backup media, comprising:
   reading at least a portion of the source data comprising one or more blocks from the source storage volume;
   generating a hash of each block of source data read from the source volume;
   writing the source data read from the source volume to said backup media as backup data; and
   writing the hash on the backup media and associating the hash with the backup data corresponding to the block of source data from which the hash was generated.

2. The method of claim 1 further comprising reading backup data and an associated hash from the backup media;
   generating another hash from the backup data read from the backup media; and
   comparing the associated hash read from the backup media with the other hash to verify the integrity of the backup data.

3. The method of claim 2 further comprising, upon said compared hashes not matching, marking the backup data as miscomparing, and rewriting the corresponding source data to the backup media from the source volume upon performing a subsequent backup.

4. The method of claim 1, wherein said associating said hash comprises writing a hash on the backup media for each block adjacent to such data blocks.

5. The method of claim 1, wherein each of said blocks of data comprises a plurality of file data records, and wherein said generating comprises generating and accumulating a hash for each of said records.

6. The method of claim 1 further comprising reading metadata associated with a data file;
   comparing the metadata with metadata stored in a catalog for a backup file on the backup media; and
   writing the source data for the file to the backup media upon said comparing of the metadata indicating that the file has changed.

7. The method of claim 1, wherein said computer system comprises a computer network including a plurality of client computers, and said generating said hash and writing said data are performed by a backup server of said network.

8. A method of backing up source data comprising a data file having one or more blocks from a source storage volume of a source computer to backup media, the source data being stored on said backup media as backup data with an associated hash of each block of source data, comprising:

reading a block of the backup data and its associated hash from the backup media;

generating another hash from the block of back up data read from the backup media;

comparing the associated hash read from the backup media with the other hash to verify the integrity of the block of backup data; and upon said compared hashes not matching, marking the block of backup data as miscomparing and rewriting the corresponding block of source data from the source volume to the backup media.

9. The method of claim 8, wherein said rewriting comprises rewriting the block of source data from the source volume to the backup media upon performing a subsequent backup.

10. The method of claim 8 further comprising reading the backup data and its associated hash from the backup media, and writing the backup data and the hash to another backup media.

11. Computer readable media comprising instructions executed by a computer system to perform a backup method to back up source data from a source volume to backup media, the method comprising:

reading at least a portion of source data comprising one or more blocks from the source storage volume;

generating a hash of each block of source data read from the source volume;

writing the source data from the source volume to the backup media as backup data; and writing the hash to the backup media and associating the hash with the backup data corresponding to the block of source data from which the hash was generated.

12. The computer readable media of claim 11, wherein the method further comprises reading the backup data and its associated hash from the backup media; generating another hash from the backup data read from the backup media; and comparing the associated hash read from the backup media with said other hash to verify the integrity of the source data corresponding to the backup data from which the associated hash was generated.

13. The computer readable media of claim 12, wherein the method further comprises, upon said compared hashes not matching, marking the backup data as miscomparing, and rewriting the source data from the source volume corresponding to the backup data to the backup media upon performing a subsequent backup.

14. The computer readable media of claim 11, wherein said portion of source data comprises a data file including one or more sub-blocks of data, each having a predetermined length, and wherein said generating comprises generating a hash for each of said sub-blocks of data and accumulating said hashes to produce a hash representing said data file.

15. The computer readable media of claim 14, wherein said associating of the hash with the backup data comprises writing said hash on the backup media for each data file adjacent to such data file.

16. The computer readable media of claim 11, wherein the method further comprises reading metadata associated with said source data; comparing the metadata with metadata in a catalog representing a backup of said source data on the backup media; and the rewriting of the source data to the backup media upon said comparing of metadata indicating that the source data has changed.

17. The computer readable media of claim 11, wherein said computer system comprises a computer network, and said method is performed on one or more computers of said computer network.

\* \* \* \* \*